(12) United States Patent
Sugano

(10) Patent No.: US 6,508,348 B2
(45) Date of Patent: Jan. 21, 2003

(54) TRANSMISSION UNIT FOR HYBRID VEHICLE

(75) Inventor: Taku Sugano, Shizuoka (JP)

(73) Assignee: Jatco Transtechnology, Ltd., Fuji (JP)

( * ) Notice: Subject to any disclaimer, the term of this patent is extended or adjusted under 35 U.S.C. 154(b) by 33 days.

(21) Appl. No.: 09/785,483

(22) Filed: Feb. 20, 2001

(65) Prior Publication Data

US 2001/0024995 A1 Sep. 27, 2001

(30) Foreign Application Priority Data

Mar. 22, 2000 (JP) ........................................ 2000-079524

(51) Int. Cl.$^7$ ............................................... F16D 11/00
(52) U.S. Cl. .................................... 192/110 B; 192/112
(58) Field of Search ............................... 192/21.5, 112, 192/110 B; 180/165; 74/606 R

(56) References Cited

U.S. PATENT DOCUMENTS

| | | | | |
|---|---|---|---|---|
| 4,990,126 A | * | 2/1991 | Ideta et al. .................. | 475/210 |
| 5,348,518 A | * | 9/1994 | Taniguchi et al. .......... | 475/116 |
| 5,915,513 A | * | 6/1999 | Isley et al. .................. | 180/247 |
| 6,041,877 A | * | 3/2000 | Yamada et al. ............. | 180/242 |
| 6,062,735 A | * | 5/2000 | Ward .......................... | 384/492 |
| 6,258,001 B1 | * | 7/2001 | Wakuta et al. ............. | 192/3.28 |

FOREIGN PATENT DOCUMENTS

| | | | |
|---|---|---|---|
| JP | 05024447 A | * | 2/1993 |
| JP | 05030605 A | * | 2/1993 |
| JP | 09215270 A | * | 8/1997 |
| JP | 2000-9213 | | 1/2000 |

OTHER PUBLICATIONS

U.S. patent application Ser. No. 09/785,454, Sugano, filed Feb. 20, 2001.
U.S. patent application Ser. No. 09/785,455, Hasegawa, filed Feb. 20, 2001.
U.S. patent application Ser. No. 09/785,484, Sugano, filed Feb. 20, 2001.
U.S. patent application Ser. No. 09/785,485, Sugano et al., filed Feb. 20, 2001.

* cited by examiner

Primary Examiner—Rodney H. Bonck
Assistant Examiner—David D. Le
(74) Attorney, Agent, or Firm—Foley & Lardner

(57) ABSTRACT

A transmission unit for a hybrid vehicle has a single-shaft structure wherein the input from an electromagnetic clutch to a motor and a CVT is effected through a single input shaft. The input shaft is supported by first and second bearing members on both sides of the CVT, and a third bearing member provided between the input shaft and a first partition wall. Each of the first and second bearing members is fit in a hole of the housing in a manner to prevent radial motion of the input shaft, whereas the third bearing member is surrounded by a clearance for allowing radial motion of the input shaft relative to the housing. In the clearance, there is provided a seal member for preventing passage of foreign objects from the clutch chamber into the motor chamber.

11 Claims, 6 Drawing Sheets

TRANSMISSION UNIT FOR HYBRID VEHICLE

BACKGROUND OF THE INVENTION

The present invention relates to a transmission unit to be installed in a hybrid vehicle combining an engine and a motor, to obtain a driving force.

With improved fuel economy and lower emissions, hybrid vehicles benefit conservation of global environment and savings of limited resources. In a hybrid vehicle, a motor is arranged in series or parallel to an engine to assist the engine output and to serve as a generator for converting kinetic energy of the vehicle to electrical energy on deceleration.

A published Japanese patent application Publication (Kokai) No. 2000-9213 shows an apparatus for a hybrid vehicle. This apparatus includes a clutch chamber 101 defined by a first housing 113 and a first partition 116, a motor chamber 102 defined by a second housing 114, the first partition 116 and a second partition 117, and a transmission chamber 103 defined by a third housing 115 and the second partition 117, as shown in FIG. 6. The rotation of the engine is input to an electromagnetic clutch 110 in the clutch chamber 101, and the output of the electromagnetic clutch 110 is transmitted to a motor 111 in the motor chamber 102 and a transmission 112 in the transmission chamber 103 through an input shaft 100.

This input shaft 100 is rotatably supported by a bearing at each of support portions 120 and 121 which are provided in the third housing 115 and the second partition 117, respectively in a manner not to allow run-out and off-center deviation of the input shaft 100. On the sliding surface between the first partition 116 and the input shaft 100, there is provided a seal member 122 to prevent entrance into the motor chamber 102, of abrasion powder abraded from an electrode blush at a slip ring (or collector ring) 110a for supplying electric current to the electromagnetic clutch 110 in the clutch chamber 101, and moisture permeating from the joint surface between the engine and the transmission unit A.

SUMMARY OF THE INVENTION

The apparatus of the above-mentioned Japanese Publication has the following problems.

The clutch chamber 101 and the motor chamber 102 are in the dry state with no lubrication by oil. Therefore, the seal member provided therebetween requires the addition of a lubricating structure, specifically at its seal lip portion (to prevent powder produced by abrasion).

When a bearing requiring no lubrication structure is used as a seal member, the input shaft 100 is supported at three support points 120, 121 and 122 by the three bearings, as shown in FIG. 5A. In this three-point support structure including the bearing, as the seal member 122, rigidly supporting the input shaft without allowing radial motion, stress concentration is liable to occur at each support portions 120, 121 and 122 in the case of whirling motion of the input shaft 100 due to vibrations produced by the transmission 112. Consequently, the durability of the input shaft 100 and the bearings is decreased. (FIG. 5A shows the wavelike form of the input shaft exaggeratedly to illustrate the stress concentration.)

Moreover, when the support portions 120, 121 and 122 are to be assembled in this order, without providing a portion for absorbing the accumulated tolerance of constituent parts, as shown in FIG. 5C, the assembly operation of the third bearing portion 122 becomes unfeasible.

To improve the performance of the motor 111, the clearance between a rotor and a stator is set small, and there is a need for providing a predetermined clearance in addition to a part for absorbing the accumulated tolerance.

It is therefore an object of the present invention to provide a transmission unit for a hybrid vehicle which is capable of sealing an opening between a clutch chamber and a motor chamber without requiring a lubricating structure and without deteriorating the durability.

According to the present invention, a transmission unit for a hybrid vehicle comprises:

a unit housing defining a first dry chamber containing an electromagnetic clutch, a second dry chamber containing a motor, and a hydraulic wet chamber containing a transmission mechanism, and comprising a partition wall separating the first and second dry chambers;

an input shaft extending through the first dry chamber, the second dry chamber and the wet chamber, to input rotation from the electromagnetic clutch to the motor and the transmission mechanism;

first and second bearing members supporting the input shaft rotatably at first and second support points spaced from each other in the wet chamber, in a manner to prevent radial motion of the input shaft relative to the unit housing;

a third bearing member provided between the partition wall and the input shaft with a clearance interposed between the third bearing member and the partition wall, to allow radial motion of the input shaft relative to the unit housing; and a seal member provided in the clearance, for preventing passage of foreign matters from the first dry chamber to the second dry chamber.

DETAILED DESCRIPTION OF THE INVENTION

Figure 1:
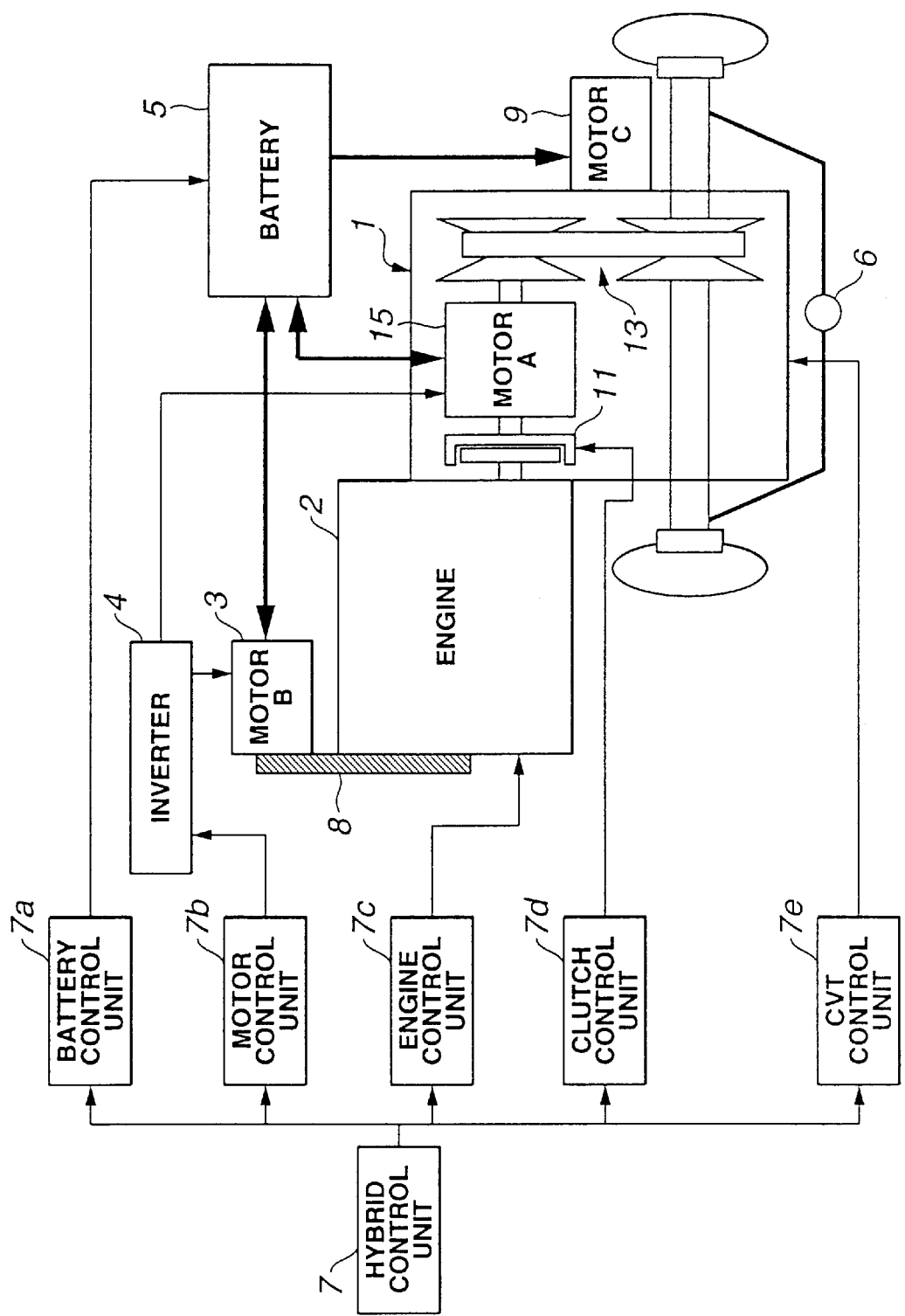
FIG. 1 is a schematic view showing a drive system of a hybrid vehicle according to one embodiment of the present invention.

FIG. 1 shows the arrangement of main units of a hybrid vehicle according to the embodiment of the invention.

The drive system shown in FIG. 1 includes a transmission unit 1, an engine 2, a B motor 3 for acting as a generator/starter, an inverter 4, a battery 5, an electric power steering 6, a hybrid control unit 7, and a chain 8.

In the transmission unit 1, there are provided an electromagnetic clutch 11, an A motor 15 for acting as a driving motor, and a continuously variable transmission (CVT) 13. The A motor 15 also acts as a regenerative motor for regeneration of energy during deceleration and braking. A C motor 9 is for driving an electric oil pump. The C motor 9 can drive the oil pump properly even in a motor drive mode in which the vehicle is driven only by the motor and the engine cannot supply sufficient power to drive the oil pump (especially to obtain a pulley pressure of the CVT 13). For the same reason, the power steering 6 is assisted by the motor.

The B motor 3 serving as generator/starter is mounted on the engine block and connected with the engine 2 through the chain 8. The B motor 3 acts as a generator in normal operation, and acts as a starter in a starting operation. Control units 7a, 7b, 7c, 7d, and 7e for the battery 5, motors 3 and 15, engine 2, clutch 11 and CVT 13 are independent, and controlled integrally by the hybrid control unit 7.

The hybrid drive system is operated as follows. The hybrid drive system in the embodiment is a parallel type. The A motor 15 assists the engine 2 which is fuel economy oriented rather than output. The CVT 13 also acts as a coordinator so that the engine operates at the optimum fuel consumption point. The clutch 11 is an electromagnetic clutch. When the clutch is in OFF state, the vehicle is operated only by the A motor 15. The clutch control unit 7d controls the ON/OFF state of the clutch 11 automatically and optimally under the command of the hybrid control unit 7.

<Starting Up the System>

When starting up the system, the B motor 3 functions as a starter to start the engine 2.

<Starting/Low-Speed Operation>

In a starting operation or a low-speed operation at low load where the fuel consumption rate of the engine 2 is low, the engine 2 stops and the vehicle is driven only by the A motor 15. If the load is heavy (the throttle opening is large), the engine 2 starts up immediately, the clutch 11 turns on, and the vehicle is driven by both the engine 2 and the A motor 15.

<Normal Running Operation>

The vehicle runs mainly by the engine 2. In this case, the operation on the best fuel consumption line is achieved by adjusting the engine speed under the shift control of the CVT 13.

<At Heavy Loads>

During operation in a heavy load region where the driving force is deficient even if the engine 2 generates the maximum output, electrical energy is supplied from the battery 5 to the A motor 15 actively to enhance the whole driving force.

<Decelerating>

When the vehicle is decelerated, the supply of fuel to the engine 2 is cut off. Simultaneously, the A motor 15 functions as a generator to convert a part of kinetic energy to electrical energy and store the electrical energy in the battery 5. Thus, kinetic energy that used to be thrown away is recovered.

<Reverse Operation>

A reverse gear is not provided in the CVT 13. Therefore, to operate the vehicle in reverse, the clutch 11 is opened and the A motor 15 is rotated in the reverse direction. The vehicle is driven only by the A motor 15.

<Stopping>

When the vehicle is stopped, the engine 2 stops except for the case of need to charge the battery 5, to operate the air compressor, or for warming-up.

Figure 2:
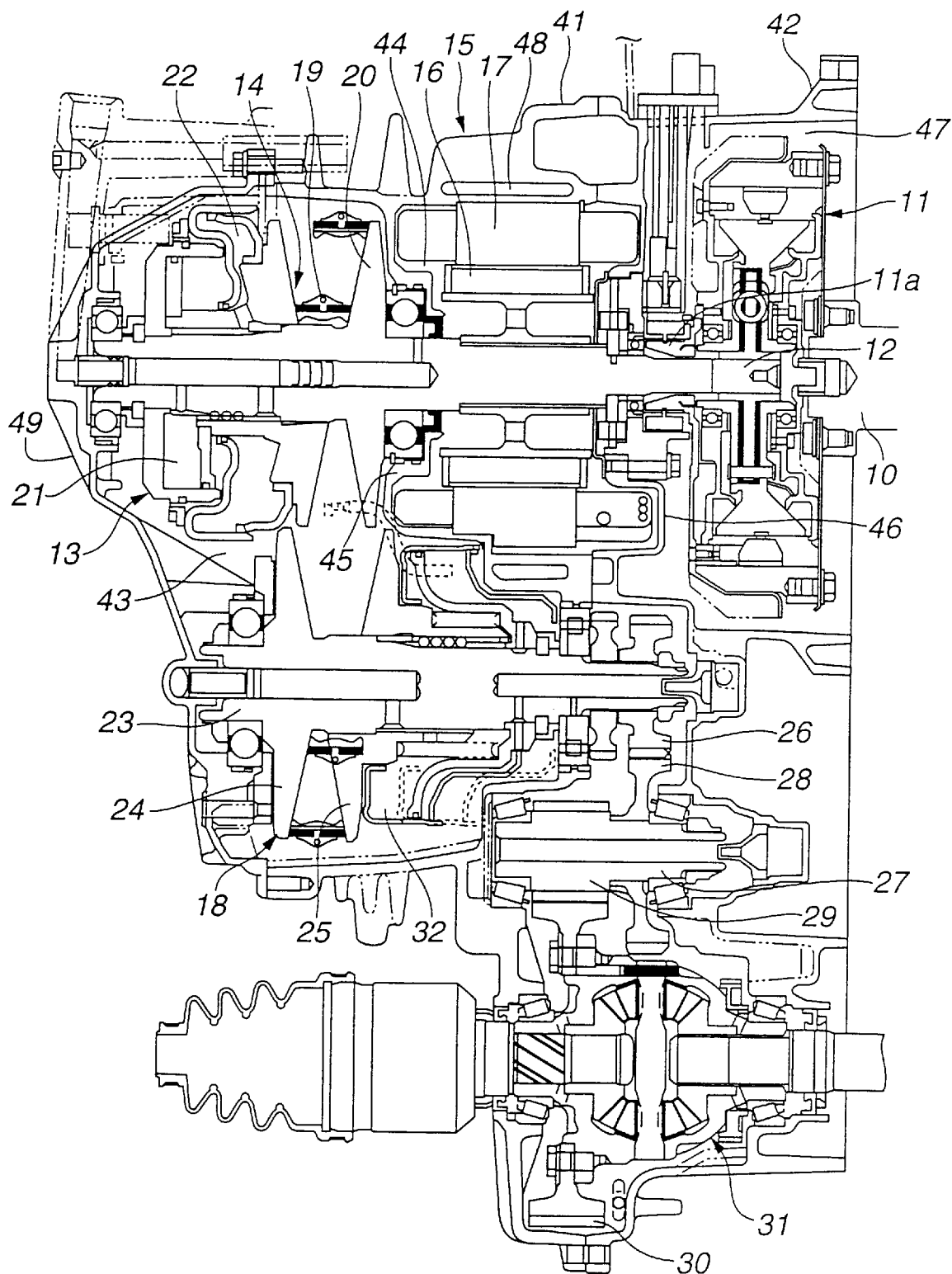
FIG. 2 is a sectional view of a transmission unit having a belt type continuously variable transmission (CVT) in the hybrid vehicle of the embodiment.

FIG. 2 shows, in section, the transmission unit 1 having the belt type continuously variable transmission (CVT) 13. In FIG. 2, an engine output shaft 10 is connected with the electromagnetic clutch 11 and an electrode member 11a is provided for supplying power to this electromagnetic clutch 11. The output side of the electromagnetic clutch 11 is connected with a transmission input shaft 12. At the end of the input shaft 12, there is provided a driving pulley 14 of the CVT 13. The A motor 15 for operating the vehicle is disposed axially between the driving pulley 14 and the electromagnetic clutch 11.

The A motor 15 includes a rotor 16 fixed to the input shaft 12 and a stator 17 fixed to the housing. The A motor receives power supply from the battery 5 to drive the input shaft 12. When the vehicle is decelerated, the A motor functions as a generator based on the torque of the input shaft 12.

The CVT 13 includes the foregoing driving pulley 14, a driven pulley 18, and a belt 19 for transmitting the torque from the driving pulley 14 to the driven pulley 18. The driving pulley 14 includes a fixed conical plate 20 for rotating integrally with the input shaft 12, and an adjustable conical plate 22 disposed opposite the fixed conical plate 20 to form a V-shaped pulley groove. The adjustable conical plate 22 is movable in the axial direction of the input shaft 12 by the hydraulic pressure in a driving pulley cylinder chamber 21. The driven pulley 18 is mounted on a driven shaft 23. The driven pulley 18 includes a fixed conical plate 24 for rotating integrally with the driven shaft 23, and an adjustable conical plate 25 disposed opposite the fixed conical plate 24 to form a V-shaped pulley groove. The adjustable conical plate 25 is movable in the axial direction of the driven shaft 23 by the hydraulic pressure in a driven pulley cylinder chamber 32.

On the driven shaft 23, a driving gear 26 is secured. The driving gear 26 is engaged with an idler gear 28 on an idler shaft 27. A pinion 29 provided on the idler shaft 27 is engaged with a final gear 30. The final gear 30 drives drive shafts leading to drive wheels (not shown) through a differential 31.

The torque inputted from the engine output shaft 10 is transmitted to the CVT 13 through the electromagnetic clutch 11 and the input shaft 12. The torque of the input shaft 12 is transmitted to the differential 31 through the driving pulley 14, the belt 19, the driven pulley 18, the driven shaft 23, the driving gear 26, the idler gear 28, the idler shaft 27, the pinion 29, and the final gear 30.

The thus-constructed transmission can vary the rotating ratio or speed ratio between the driving pulley 14 and the driven pulley 18 by moving the adjustable conical plates 22 and 25 of the driving pulley 14 and the driven pulley 18 in the axial direction to vary the contacting radii with the belt 19. The CVT control unit 7e varies the groove width of the V-shaped pulley groove of each of the driving pulley 14 and the driven pulley 18 by controlling the hydraulic pressure for the driving pulley cylinder chamber 21 or the driven pulley cylinder chamber 32.

The transmission housing is composed of a second housing 41 and a first housing 42 which are placed end to end in the axial direction, and joint together. The second housing 41 encloses the CVT 13 and the A motor 15. The first housing 42 encloses the electromagnetic clutch 11. The inside of the second housing 41 is partitioned into a transmission chamber 43 having the CVT 13 therein, and a motor chamber 44 having the A motor therein, by a second partition 45.

The first housing 42 extends axially from a first axial end to which the engine is joined, to a second axial end to which the second housing 41 is joined. The first housing 42 includes a first partition 46 at the second axial end. In the assembled state in which the housings 41 and 42 are joined together, the motor chamber 44 is defined axially between the second partition 45 and the first partition 46. A clutch chamber 47 is defined axially between the first partition 46 and the engine 2 joined to the first axial end of the first housing 42.

The stator 17 of the A motor 15 is fixed in the motor chamber 44 by shrinkage fit to simplify the structure. A cooling-water jacket 48 is formed around the stator 17 in the second housing 41 to circulate cooling water for efficient cooling of the A motor 15.

Figure 3:
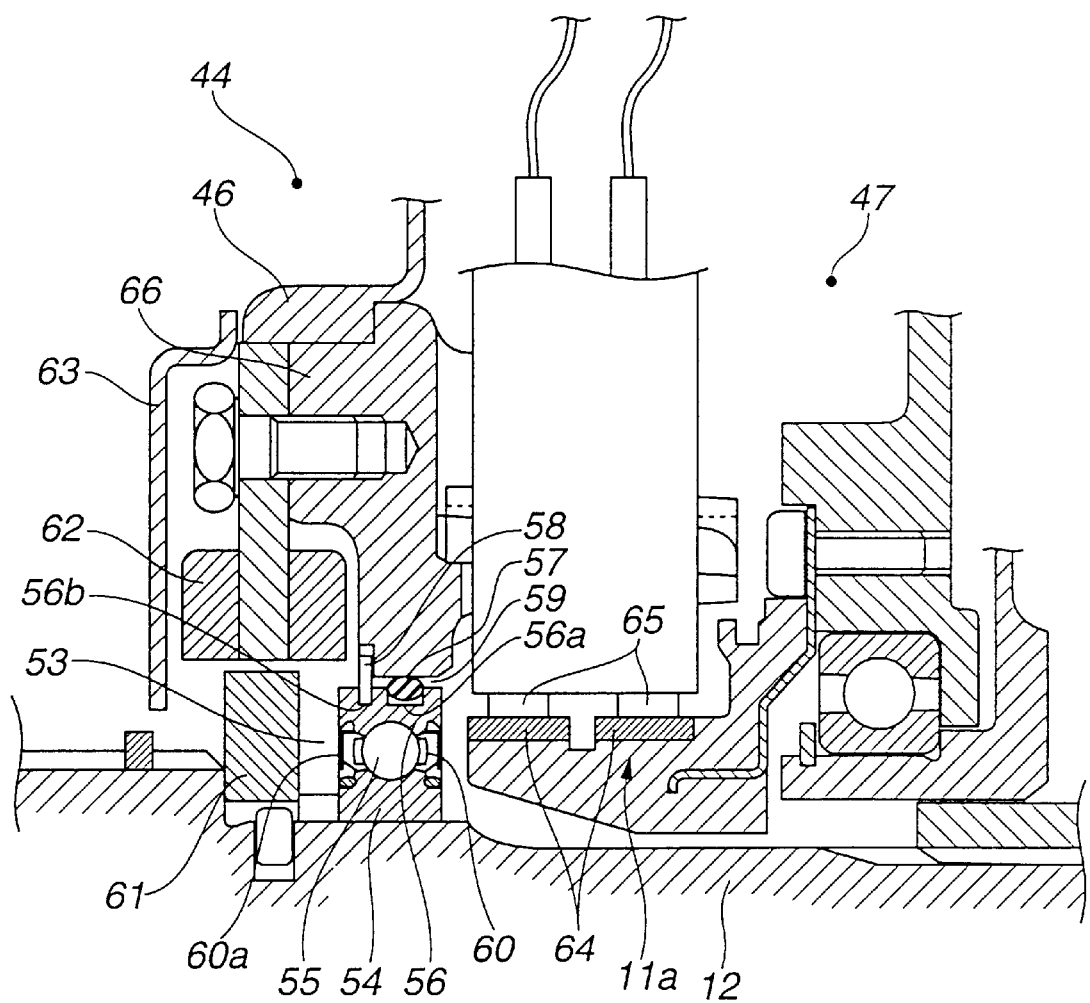
FIG. 3 is an enlarged sectional view of a third bearing portion in the transmission unit of FIG. 2.

FIG. 3 shows the structure for supporting the input shaft in the embodiment.

FIG. 3 is an enlarged sectional view of a third bearing 53. A front cover 66 is fixed to the first partition 46 to form a first partition wall separating the motor chamber 44 and the clutch chamber 47. Between the front cover 66 and the input shaft 12, there are provided the third bearing 53 filled with grease and a resolver rotor 61 for rotating with the input shaft 12. On the motor chamber's side of this front cover 66, there are provided a resolver stator 62 for detecting the rotational position of the A motor 15, and a magnetic shield plate 63 for preventing the effect of the magnetic field generated due to the A motor 15 on the resolver stator 62 and the resolver rotor 61.

In the clutch chamber 47, there is provided the electrode member 11a for supplying power to the electromagnetic clutch 11. Electrode terminals 65 of the electrode member 11a supply power by being pressed and contacted by slip rings 64 for rotating with the engine output shaft 10.

The third bearing 53 includes an inner race 54 fixed to the input shaft 12, an outer race 56 held unrotatable relative to the first partition wall (46, 66) by at least one stopper member 58, balls 55, a cage or retainer 60 for retaining the balls 55, and a sealing plate 60a for sealing grease filled in the third bearing 53. The stopper member 58 is a stopper pin in this example. The stopper member 58 extends radially and is engaged in a hollow portion formed in the front cover 66 in a manner to allow radial motion of the outer race 56.

The outer race 56 is formed with at least one pin hole 56b for holding the stopper pin 58 for fixing the outer race 56 in the rotational direction, and an O-ring groove 56a for holding an O-ring 57 for sealing abrasion powder or water. The outer race 56 has an outside cylindrical surface facing radially outward. The pin hole 56b and the ring groove 56a are formed in the outside cylindrical surface of the outer race 56. The ring groove 56a is located axially between the pin hole 56b and the clutch chamber 47. The pin hole 56b is located axially between the ring groove 56a and the second bearing 52.

A clearance 59 is formed between the outer race 56 of the third bearing 53 and the first partition wall (46, 66). The outer race 56 is surrounded by the clearance 59. The front cover 66 forming the first partition wall is formed with a hole having an inside cylindrical surface surrounding, and facing toward, the outside cylindrical surface of the outer race 56. The clearance is formed radially between the outside cylindrical surface of the outer race 56 and the inside cylindrical surface of the front cover 66.

Figure 4:
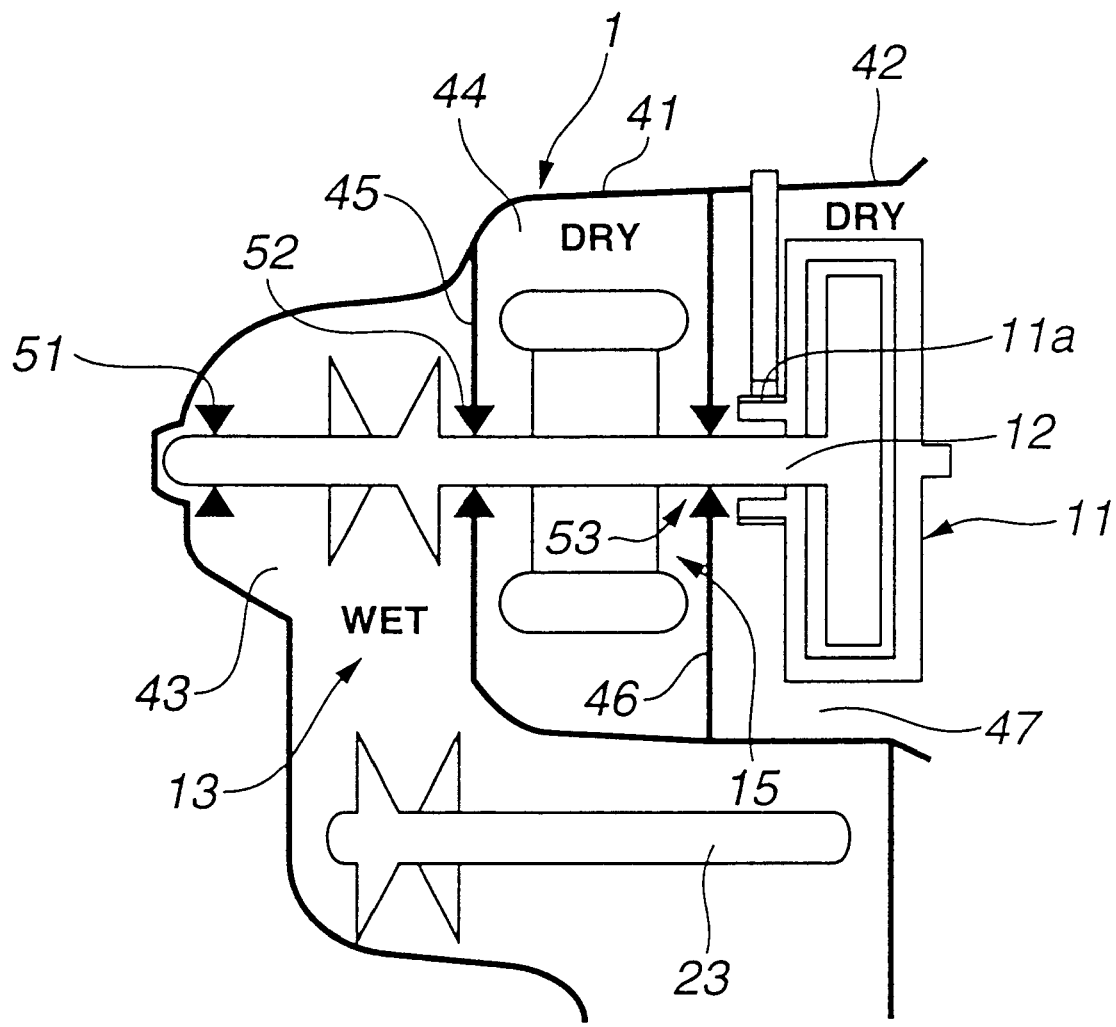
FIG. 4 is a schematic view of the transmission unit of FIG. 2.

The transmission unit for a hybrid vehicle in the embodiment is operated as follows. FIG. 4 is a skeleton diagram showing the configuration of the embodiment. When the engine starts up and the electromagnetic clutch turns on, the input shaft 12 rotates and the rotation is transmitted to the motor and the transmission. The clutch chamber 47 and the motor chamber 44 are dry chambers, and the transmission chamber 43 is a wet chamber lubricated by oil. When the input shaft 12 vibrates by the vibration generated in the transmission chamber 43, the vibration is transmitted to the third bearing 53. In this case, the clearance 59 formed between the outer race 56 of the third bearing 53 and the first partition 46 permits radial motion of the input shaft 12 to the extent determined by the radial dimension of the clearance 59. The O ring 57 and the ring groove 56a are so designed as to hold sealing contact of the O ring 57 with the inside cylindrical surface of the hole in the front cover 66 while permitting the radial motion of the input shaft 12. Thus, the third bearing portion allows vibrations.

Figure 5A:
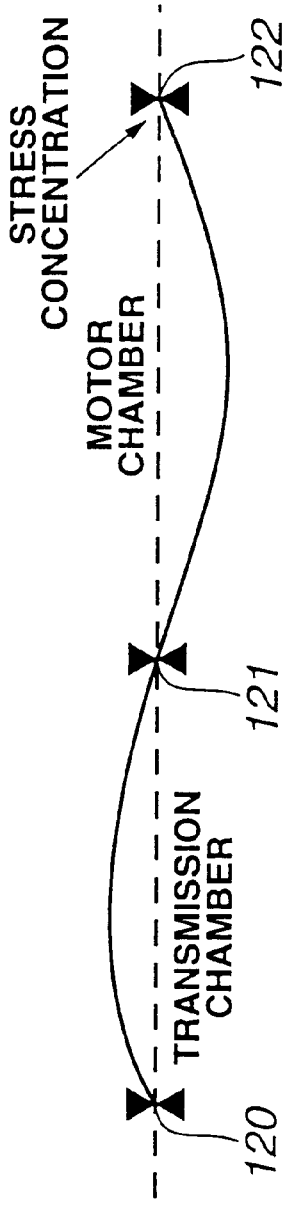
FIGS. 5A, 5B and 5C are views for illustrating operations of an input shaft support structure according to the embodiment.
Figure 5B:
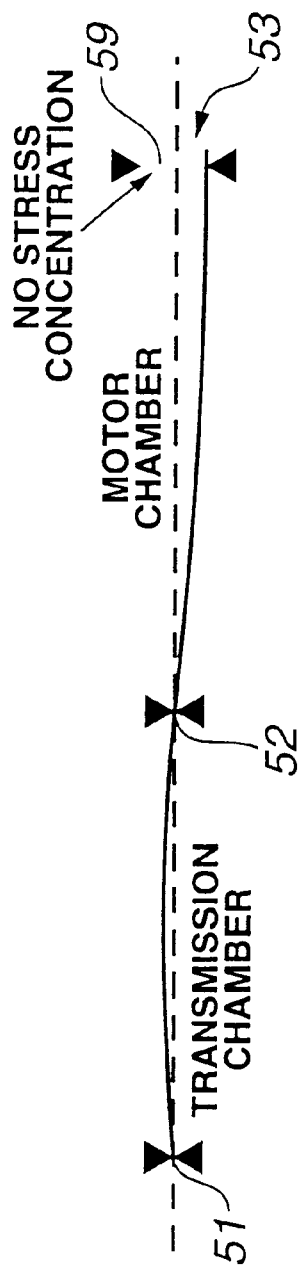
Figure 5C:
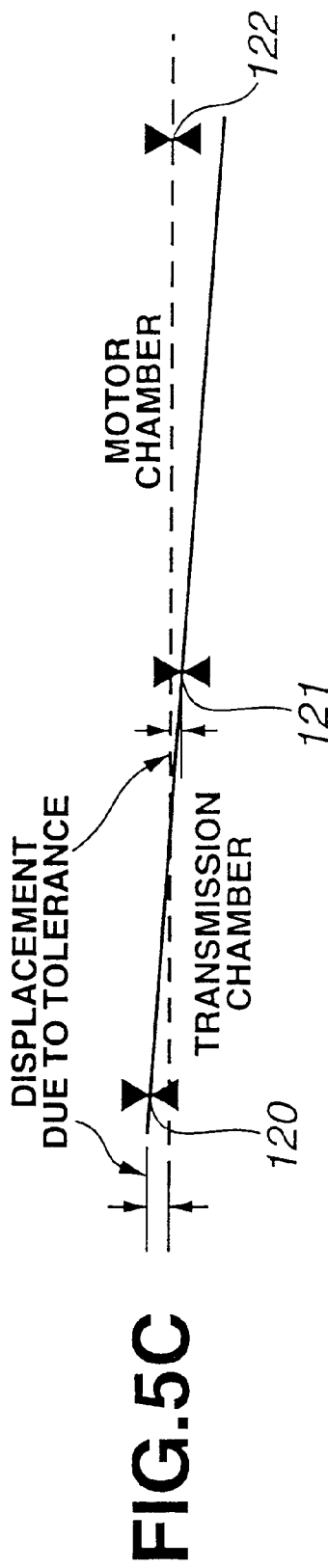
Figure 6:
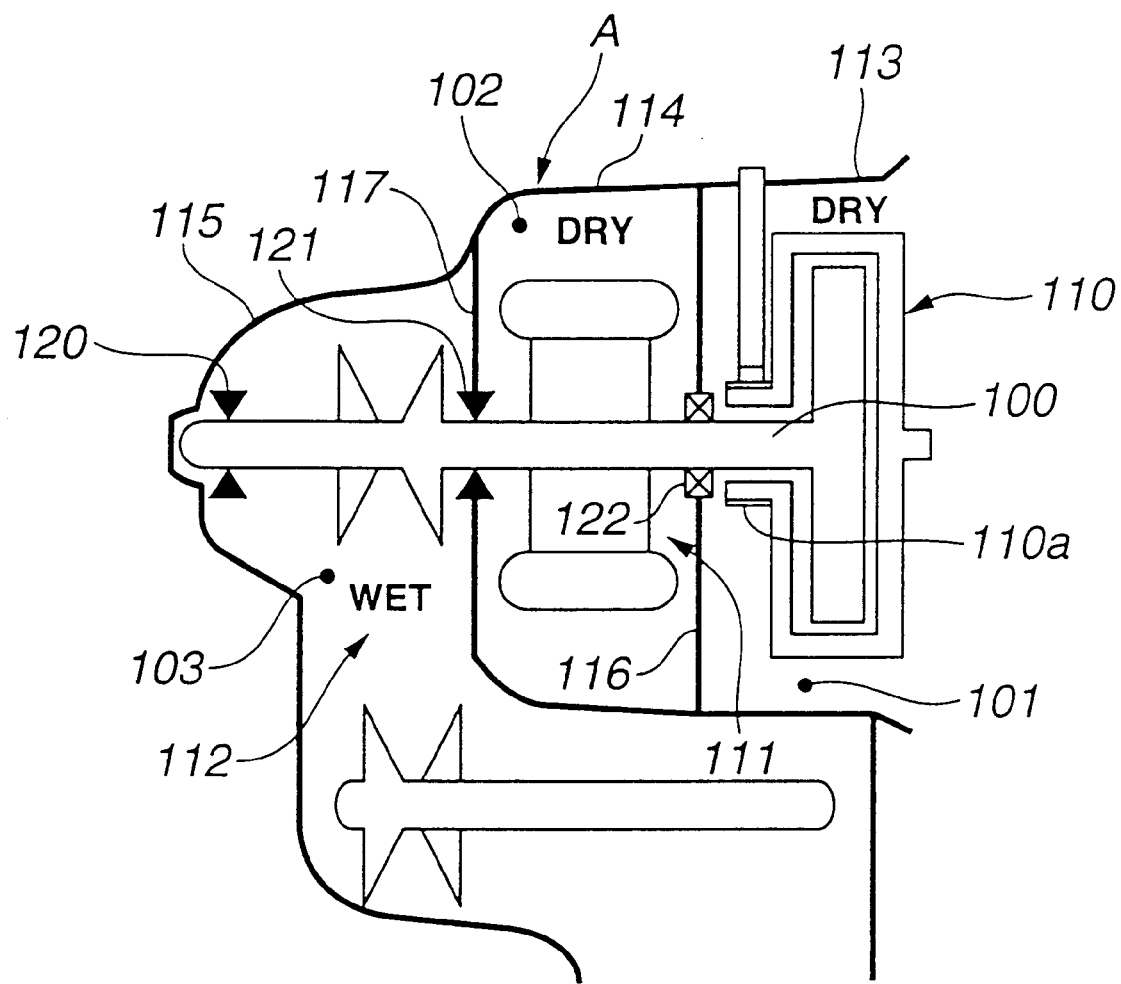
FIG. 6 is a schematic view showing an input shaft support structure of a related art.

FIG. 5A illustrates the stress concentration in a three-point support structure supporting the input shaft 12 at three support points 120, 121 and 122. FIG. 5B illustrates the support structure according to the embodiment. Unlike the three-point support structure of FIG. 5A, the clearance 59 in the support structure of FIG. 5B functions to prevent stress concentration at each support point by allowing vibrations at the third support point (53). Therefore, the support structure of FIG. 5B provides stable input rotation to the A motor 15 and the CVT 13, and improves the durability of the input shaft 12 and each bearing 51, 52 or 53. Moreover, center deviation due to tolerance of the input shaft 12 accumulated after setting up is allowed by the clearance 59 to simplify the setting up.

The clutch chamber 47 and the motor chamber 44 are dry, so that the lubrication for the third bearing 53 is not feasible. However, the third bearing 53 does not require lubrication because the outer race 56 is held unrotatable relative to the first partition wall, the rolling elements 55 reduce friction in the relative rotation between the input shaft 12 and the first partition wall, and the grease is confined in the third bearing 53.

There is provided, between the outer race 56 of the third bearing 53 and the front cover 66, the stopper pin or locking pin 58 for preventing rotation of the outer race 56. The input shaft 12 rotates as a unit with the inner race 54, and the outer race 56 is fixed in the rotational direction to the front cover 66 of the first partition wall. Thus, the third bearing 53 supports the input shaft 12 rotatably, and the O-ring 57 is durable between the front cover 66 and the outer race 56 held unrotatable.

Further, the O ring 57 can reliably prevent passage of powder produced by abrasion between the electrode terminals 65 and slip rings 64 of the electromagnetic clutch 11, and moisture permeating through the joint surface between the engine and the transmission unit.

The clearance 59 is annular at least when the input shaft 12 is located correctly at the center of the circular hole formed in the front cover 66. The clearance 59 is sized to absorb the eccentricity of the input shaft 12 caused by tolerances of parts of the assembly, and thereby facilitate the assembly process.

Although the invention has been described above by reference to certain embodiments of the invention, the invention is not limited to the embodiments described above. Modifications and variations of the embodiments described above will occur to those skilled in the art in light of the above teachings. The scope of the invention is defined with reference to the following claims.

What is claimed is:

1. A transmission unit for a hybrid vehicle, the transmission unit comprising:
   a unit housing defining a first dry chamber containing an electromagnetic clutch, a second dry chamber containing a motor, and a wet chamber containing a transmission mechanism, and comprising a partition wall separating the first and second dry chambers;
   an input shaft extending through the first dry chamber, the second dry chamber and the wet chamber, to input rotation from the electromagnetic clutch to the motor and the transmission mechanism;

first and second bearing members supporting the input shaft rotatably at first and second support points spaced from each other in the wet chamber, in a manner to prevent radial motion of the input shaft relative to the unit housing;

a third bearing member provided between the partition wall and the input shaft with a clearance interposed between the third bearing member and the partition wall, to allow radial motion of the input shaft relative to the unit housing; and a seal member provided in the clearance, for preventing passage of foreign matters from the first dry chamber to the second dry chamber.

2. The transmission unit as claimed in claim 1, wherein an eccentricity of the input shaft allowed by the clearance is greater than an eccentricity of the input shaft due to an accumulated tolerance in an assembled state.

3. The transmission unit as claimed in claim 1, wherein the seal member is an O-ring.

4. The transmission unit as claimed in claim 3, wherein the third bearing member is a grease-filled bearing.

5. The transmission unit as claimed in claim 4, wherein the third bearing member comprises a sealing member for sealing grease.

6. A transmission unit for a hybrid vehicle, the transmission unit comprising:

a unit housing defining a first dry chamber containing an electromagnetic clutch, a second dry chamber containing a motor, a wet chamber containing a transmission mechanism, and comprising a partition wall separating the first and second dry chambers;

an input shaft extending through the first dry chamber, the second dry chamber and the wet chamber, to input rotation from the electromagnetic clutch to the motor and the transmission mechanism;

first and second bearing members supporting the input shaft rotatably at first and second support points spaced from each other in the wet chamber, in a manner to prevent radial motion of the input shaft relative to the unit housing;

a third bearing member provided between the partition wall and the input shaft with a clearance interposed between the third bearing member and the partition wall, to allow radial motion of the input shaft relative to the unit housing; and a seal member provided in the clearance,.for preventing passage of foreign matters from the first dry chamber to the second dry chamber, wherein the third bearing member comprises an outer race, the transmission unit further comprises a stopper pin provided between the outer race of the third bearing and the partition wall, for preventing rotation of the outer race.

7. The transmission unit as claimed in claim 6, wherein the outer race of the third bearing member is formed with an annular groove receiving the seal member.

8. The transmission unit as claimed in claim 7, wherein the partition wall is formed with a hollow portion receiving the stopper pin attached to the outer race of the third bearing member, and extending radially to an extent to allow radial motion of the outer race of the third bearing member.

9. The transmission unit as claimed in claim 1, wherein the partition wall of the unit housing is a radially extending first partition wall, the unit housing further comprises a radially extending second partition wall separating the second dry chamber and the wet chamber, and an end wall bounding the wet chamber, the first bearing member comprising an outer race fixed to the end wall of the unit housing in a rigid manner not to influence radial motion of the input shaft, the second bearing member comprises an outer race fixed to the second partition wall in the rigid manner not to influence radial motion of the input shaft, and the third bearing member comprises an outer race fit in a hole of the first partition wall with the clearance surrounding the outer race of the third bearing member and allowing radial motion of the outer race of the third bearing in the hole of the first partition wall.

10. A transmission unit for a hybrid vehicle, comprising:

an electromagnetic clutch disposed in a first dry chamber;

a motor disposed in a second dry chamber;

a transmission disposed in a wet chamber;

an input shaft extending through the first dry chamber, the second dry chamber and the wet chamber, and connecting the electromagnetic clutch drivingly to the motor and the transmission;

first and second bearings members rotatably supporting the input shaft, respectively, at first and second support points separated from each other by a space in the wet chamber;

a unit housing defining the first and second dry chambers and the wet chamber, and having a first partition wall separating the first dry chamber from the second dry chamber, the first partition wall being formed with a hole defined by an inside circumferential wall surface, facing radially inwardly toward, and surrounding the input shaft;

a third bearing member disposed between the input shaft and the first partition wall, the third bearing member comprising an outer race fit in the hole of the first partition wall with a radial clearance for allowing radial motion of the input shaft, the outer race being formed with an annular groove; and a seal member disposed in the radial clearance, for preventing passage of foreign objects from the first dry chamber to the second dry chamber, the seal member being held in the annular groove.

11. The transmission unit as claimed in claim 10, wherein the transmission unit further comprises at least one stopper member extending radially from the outer race of the third bearing member to the first partition wall, and preventing rotation of the outer race relative to the first partition wall while allowing radial motion of the outer race within the hole of the first partition wall.

* * * * *